March 9, 1948.   J. C. TARBELL   2,437,447
FLY CATCHING DEVICE
Filed March 5, 1945
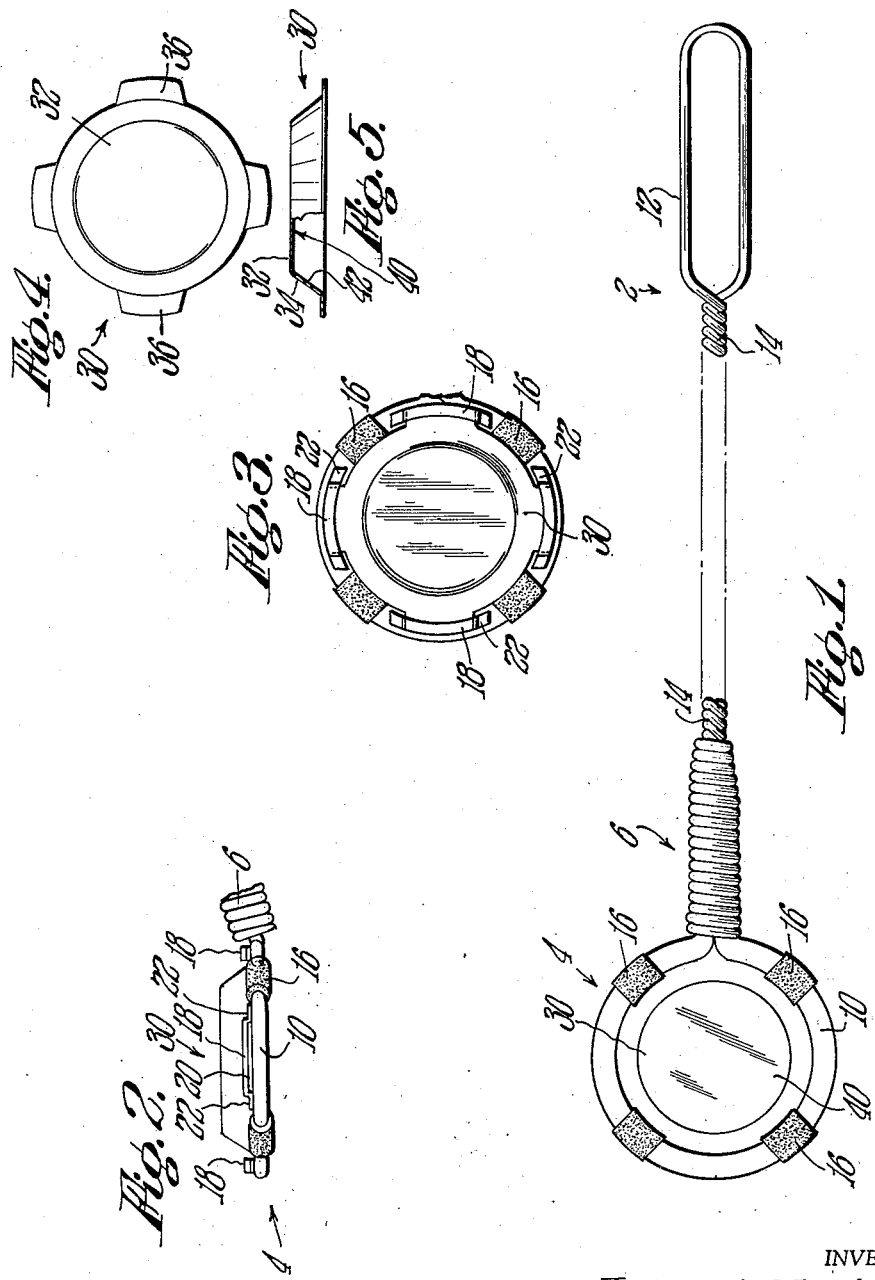
INVENTOR.
BY John C. Tarbell.
Walter C. Ross, Attorney.

Patented Mar. 9, 1948

2,437,447

UNITED STATES PATENT OFFICE 2,437,447

FLY CATCHING DEVICE

John C. Tarbell, Springfield, Mass.

Application March 5, 1945, Serial No. 580,992

4 Claims. (Cl. 43—136)

This invention relates to improvements in fly catching devices.

The principal objects of the invention are directed to the provision of a fly catcher of novel form which is characterized by means which is releasably associated with the catcher and adapted to catch flies and other insects.

As a special feature of the invention the device includes a ring-like head on a handle arranged whereby a cup, which may be of paper or the like, may be removably secured thereto. The cup has an inner sticky surface so that as the device is brought down over a fly, it sticks to the sticky inner surface of the cup and in that way catches a fly.

The fly catcher of the invention is simple in form so as to be economical to manufacture while at the same time it is efficient in operation.

With the foregoing and various other novel features and advantages and other objects of my invention as will become more apparent as the description proceeds, the invention consists in certain novel features of construction and in the combination and arrangement of parts as will be hereinafter more particularly pointed out in the claims hereunto annexed and more fully described and referred to in connection with the accompanying drawings wherein:

Fig. 1 is an inverted plan view of a fly catcher embodying the novel features of the invention;

Fig. 2 is a side elevational view of the head end of the fly catcher shown in Fig. 1;

Fig. 3 is a plan view of the head of the fly catcher;

Figs. 4 and 5 are plan and side elevational views of the cup of the invention.

Referring now to the drawings more in detail, the invention will be fully described.

The fly catcher of the invention includes in a general way a handle 2, head 4 and connector 6.

The head member 4 is preferably formed from an elongated member into circular ring-like shape as indicated by 10. This member 10 may be of wire which is preferably of greater width than height as shown in Figs. 1 and 2.

Opposite ends of the member 10 are secured in one end of the connector 6. The said connector is preferably in the form of a closely wound spring so as to be more or less flexible. The opposite ends of the member 10 may be twisted about one another and inserted in the member 6 for securing the parts together.

The handle 2 may include a length of wire doubled intermediate its ends to form a manually engageable grip or loop 12 with the end portions twisted about one another to provide a shank 14 which has its extremity inserted in the end of member 6 to secure the parts together.

The handle or shank may be more or less flexible and the connector being flexible the head is mounted yieldingly relative to the handle.

Resilient or yieldable pads 16 are provided on the member 10. These may be made from felt, rubber, or some composition which is yieldable or resilient and may take any form desired. When the head of the device is brought down onto a surface or object the pads not only cushion the blow but prevent the head from marring the object.

A plurality of retainers or clips 18, and there may be any desired number, are associated with the upper side of the member 10. These clips 18 have intermediate portions spaced from the upper side of the member to provide slots 20 and have their end portions 22 secured to the member 10 by any suitable means such as by welding.

A cup 30 is provided which has a bottom wall 32 and a side wall 34. Tabs or ears 36 extend radially from the side wall 34 of the cup which are receivable in the slots 20 provided by the clips so that the cup closes the upper side of the opening in the head or the opening which is formed by the member 10.

The cup is preferably made from inexpensive material such as paper. The inner surfaces such as 40 of the bottom wall and 42 of the side wall should carry a tacky adhesive. The cup is releasably associated with the head by inserting tabs 36 in the slots 20 of the clips 18.

Since the cup is of inexpensive material, it is readily and easily replaced as may be desired.

With a cup in place on the head the grip is grasped in the hand so that the device may be swung to bring the head onto a surface over a fly or insect so that the impact causes the fly or insect to be secured by the adhesive on the inner surface of the cup.

The pads prevent the impact of the head from marring a surface and the handle which may be more or less flexible and the yieldable connector provide the desired flexibility for the desired manipulation of the device.

The invention may be embodied in other specific forms without departing from the essential characteristics thereof. Hence, the present embodiments are therefore to be considered in all respects merely as being illustrative and not as being restrictive, the scope of the invention being indicated by the appended claims rather than by the foregoing description, and all modifications and variations as fall within the meaning and purview and range of equivalency of the appended claims are therefore intended to be embraced therein.

What it is desired to claim and secure by Letters Patent of the United States is:

1. As a new article of manufacture a fly catcher comprising in combination, a relatively rigid head member in the form of an annulus having an opening therethrough, a handle member having a manually engageable outer end portion and an inner portion, relatively yieldable connecting means between the inner portion of the handle member and said head member whereby said head and handle members are relatively yieldable, a cup at one side of said head member having an open mouth over the opening therethrough and having side and bottom walls, and means for releasably engaging said cup provided on said one side of said head, said releasably engaging means including members secured to said one side of said head member having portions thereof spaced from said head member forming therewith slots, and tabs extending outwardly radially from the side wall of said cup receivable in said slots.

2. As a new article of manufacture a fly catcher comprising in combination, a relatively rigid head member in the form of an annulus having an opening therethrough, a handle member having a manually engageable outer end portion and an inner portion, relatively yieldable connecting means between the inner portion of the handle member and said head member whereby said head and handle members are relatively yieldable, a cup at one side of said head member having an open mouth over the opening therethrough and having side and bottom walls, and means for releasably engaging said cup provided on said one side of said head, said releasably engaging means including members secured to said one side of said head member having portions thereof spaced from said head member forming therewith slots, and tabs extending outwardly radially from the side wall of said cup receivable in said slots, and yieldable cushion-like members carried by said head member having face portions disposed in planes spaced outwardly from the plane of the other side of said head for engaging a surface and spacing said other side of the head therefrom.

3. As a new article of manufacture a fly catcher comprising in combination, a relatively rigid head member in the form of an annulus having an opening therethrough, a handle member having a manually engageable outer end portion and an inner portion, relatively yieldable connecting means between the inner portion of the handle member and said head member whereby said head and handle members are relatively yieldable, a cup at one side of said head member having an open mouth over the opening therethrough and having side and bottom walls, and means for releasably engaging said cup provided on said one side of said head, said releasably engaging means including members secured to said one side of said head member having portions thereof spaced from said head member forming therewith slots, and tabs extending outwardly radially from the side wall of said cup receivable in said slots, the inner surfaces of the walls of the cup being provided with a tacky adhesive.

4. As a new article of manufacture a fly catcher comprising in combination, a relatively rigid head member in the form of an annulus having an opening therethrough, a handle member having a manually engageable outer end portion and an inner portion, a member connecting said head member and inner portion of the handle member in the form of a yieldable coil spring whereby said head member and handle member are relatively yieldable, members secured to one side of said head member having portions spaced therefrom providing therewith tab receiving slots, a paper cup at said one side of the head having an open mouth over the opening therein and provided with radially extending tabs disposed in said slots, and yielding cushion-like members on said head having face portions disposed in planes spaced outwardly from the plane of the other side of said head for engaging a surface and spacing said other side of the head therefrom.

JOHN C. TARBELL.

REFERENCES CITED

The following references are of record in the file of this patent:

UNITED STATES PATENTS

| Number | Name | Date |
|---|---|---|
| 488,851 | Stock | Dec. 27, 1892 |
| 975,570 | Porter | Nov. 15, 1910 |
| 1,005,443 | Luckett | Oct. 10, 1911 |
| 1,053,721 | Flynn | Feb. 18, 1913 |
| 1,065,742 | Stearns | June 24, 1913 |
| 1,470,435 | Fowler | Oct. 9, 1923 |
| 1,640,016 | Wills | Aug. 23, 1927 |
| 2,292,614 | Copeman | Aug. 11, 1942 |

FOREIGN PATENTS

| Number | Country | Date |
|---|---|---|
| 251,448 | Great Britain | May 6, 1926 |